(12) United States Patent
Tsai et al.

(10) Patent No.: US 11,379,400 B2
(45) Date of Patent: Jul. 5, 2022

(54) EXTENSION APPARATUS FOR UNIVERSAL SERIAL BUS INTERFACE

(71) Applicant: Aver Information Inc., New Taipei (TW)

(72) Inventors: Ting-Ju Tsai, New Taipei (TW); Fu-En Tsai, New Taipei (TW); Hung-Heng Hsu, New Taipei (TW); Ming-Kang Chuang, New Taipei (TW); Yung-Chun Lin, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 71 days.

(21) Appl. No.: 16/521,669

(22) Filed: Jul. 25, 2019

(65) Prior Publication Data

US 2020/0293479 A1   Sep. 17, 2020

(30) Foreign Application Priority Data

Mar. 14, 2019   (TW) .................................. 108108671

(51) Int. Cl.
 *G06F 13/40*   (2006.01)
 *H04L 29/08*   (2006.01)
 (Continued)

(52) U.S. Cl.
 CPC ...... *G06F 13/4068* (2013.01); *G06F 13/4282* (2013.01); *H04L 1/0011* (2013.01);
 (Continued)

(58) Field of Classification Search
 CPC ............ G06F 13/4068; G06F 13/4282; H04L 69/324; H04L 65/607; H04L 1/0011; H04L 1/0041
 See application file for complete search history.

(56) References Cited

U.S. PATENT DOCUMENTS

2004/0177197 A1* 9/2004 McLeod ............... G06F 13/426
                                                710/300
2017/0046289 A1* 2/2017 Hundal ............... G06F 13/4022
                      (Continued)

*Primary Examiner* — Idriss N Alrobaye
*Assistant Examiner* — Brooke J Taylor
(74) *Attorney, Agent, or Firm* — McClure, Qualey & Rodack, LLP

(57) ABSTRACT

An extension apparatus for a universal serial bus (USB) interface includes a transmitting device, a receiving device and an electrical signal network cable. The transmitting device includes the following elements: a first packet-processing unit to receive a first interface packet and generate an original data accordingly, a first buffering unit to temporarily store the original data, and a first data-converting unit to generate and output a network packet signal based on the original data. The receiving device includes the following elements: a second data-converting unit to receive the network packet signal and generate the original data accordingly, a second buffering unit to temporarily store the original data, and a second packet-processing unit to receive the original data and generate the first interface packet. The electrical signal network cable is electrically coupled between the transmitting device and the receiving device to transmit the network packet signal.

9 Claims, 4 Drawing Sheets

(51) Int. Cl.
*H04L 29/06* (2006.01)
*H04L 69/324* (2022.01)
*H04L 65/60* (2022.01)
*H04L 1/00* (2006.01)
*G06F 13/42* (2006.01)

(52) U.S. Cl.
CPC .......... *H04L 1/0041* (2013.01); *H04L 65/607* (2013.01); *H04L 69/324* (2013.01); *G06F 2213/0042* (2013.01)

(56) References Cited

U.S. PATENT DOCUMENTS

2019/0012275 A1\* 1/2019 Corbin .................. G06F 13/385
2019/0171603 A1\* 6/2019 Wu ..................... G06F 13/4045

\* cited by examiner

EXTENSION APPARATUS FOR UNIVERSAL SERIAL BUS INTERFACE

CROSS REFERENCE TO RELATED APPLICATIONS

This Non-provisional application claims priority under 35 U.S.C. § 119(a) on Patent Application No. 108108671 filed in Republic of China on Mar. 14, 2019, the entire contents of which are hereby incorporated by reference.

BACKGROUND

1. Technical Field

The present invention generally relates to an extension apparatus, and more particularly, to an extension apparatus for a universal serial bus (USB) interface.

2. Description of Related Art

With significant progress of electronic and communication technology, universal serial bus (USB) technique has been widely employed in daily life. Usually, a host and its peripheral devices are connected to one another by USB interfaces and hence perform data transmission there-between. Advancing from older versions of USB standards (i.e., the USB 2.0 and USB 3.0 (also named as "USB 3.1 Gen1") standards), nowadays, the up-to-date USB standard (i.e., the USB 3.1 Gen2 standard) has been launched. Also, a USB Type-C connector is newly introduced, which provides variety of functions including data transmission and power delivery (PD).

More particularly, the USB 3.0 (or termed as "USB 3.1 Gen1") standard refers to the third version of USB standard, which operates at a speed-mode called "Super Speed (SS)". Furthermore, the USB 3.0 standard performs full-duplex transmission and employs "list-section" technique, which achieves a maximum data rate of 5 Gbps (or, a maximum baud rate of 625 MBps) and hence potentially supports high-speed optical transmission (over optical fibers). Moreover, the USB 3.0 standard is backward-compatible with the USB 2.0 and USB 1.1 standards, which employs 3-level multilayer power-management to meet various power-consumption requirements and can hence supply various types of devices.

In the physical layer, the USB standards employ "differential signal" to execute data transmission, and accordingly, a USB 2.0 interface may operate at a frequency of 240 MHz (the operating frequency for sampling and processing physical "differential signal") to achieve a data rate of 480 Mbps (the overall data rate at which "logical data bits" are transmitted). Likewise, to reach an overall data rate of 5 Gbps, a USB 3.0 interface should have an operating frequency of 2.5 GHz.

However, a typical USB 3.1 Type-C transmission line usually has a length under 1.5 meters. On the other hand, length of a USB 3.1 Type-C to Type-C transmission line (with Type-C connectors at both ends) defined by USB-IF, is usually smaller than 2 meters. Furthermore, no more than four cascades of transmission lines are allowed for USB 3.1 Type-C to Type-C ones. Accordingly, typical USB transmission lines, either ones of USB 3.1 Type-C or ones of USB 3.1 Type-C to Type-C (even though connected in a cascaded manner) cannot provide sufficient transmission range as required by a real-time video conference system. For example, such video conference is usually held in a wide-range conference room, within which concerned devices of the video conference system (i.e., a conference host and its peripheral devices such as camera devices, microphones, speakers or display devices, all are usually USB-based) may be diversely located. In other words, these concerned devices may be greatly set apart from one another and hence difficult to be connected by typical USB transmission lines. To address the above-identified problem, it is desirable to further extend transmission range of typical USB-based transmission medium (USB connectors, USB transmission lines or other components) to facilitate usage of USB-based devices.

SUMMARY OF THE INVENTION

Given the above, the present invention is directed to an extension apparatus for a USB interface capable of extending transmission range or transmission distance between peer USB-based devices, which can obviate one or more problems resulting from the limitations and disadvantages of the prior art.

To achieve the above, the present invention is to provide an extension apparatus for a universal serial bus (USB) interface, including a transmitting device, including a first packet-processing unit, for receiving a first interface packet and generating an original data based on the first interface packet; a first buffering unit, being electrically coupled with the first packet-processing unit and temporarily storing the original data; and a first data-converting unit, being electrically coupled with the first buffering unit and generating a network packet signal based on the original data; and a receiving device, including a second data-converting unit, for receiving the network packet signal and generating the original data which is recovered from the network packet signal; a second buffering unit, being electrically coupled with the second data-converting unit and temporarily storing the original data; and a second packet-processing unit, being electrically coupled with the second buffering unit to receive the original data, and generating the first interface packet based on the original data; and an electrical signal network cable, being electrically coupled between the transmitting device and the receiving device so as to transmit the network packet signal.

In one embodiment of the present invention, wherein the first data-converting unit further includes a first data-compressing module and a first network packet-processing module. The first data-compressing module converts the original data into an intermediate compressed data based on a first compression standard. The first network packet-processing module performs an error-correction encoding procedure to obtain the network packet signal based on the intermediate compressed data.

In one embodiment of the present invention, wherein the second data-converting unit further includes a second network packet-processing module and a second data-compressing module. The second network packet-processing module receives the network packet signal and performs the error-correction encoding procedure to obtain the intermediate compressed data based on the network packet signal. The second data-compressing module converts the intermediate compressed data into the original data based on the first compression standard.

In one embodiment of the present invention, wherein the electrical signal network cable includes an unshielded twisted pair (UTP) or a category-6 cable (CAT-6).

In one embodiment of the present invention, wherein the first interface packet includes a real-time image information and/or a real-time audio information.

In one embodiment of the present invention, wherein the electrical signal network cable has a length ranging from approximately 5 to 100 meters.

In one embodiment of the present invention, wherein the first interface packet is compliant with USB 3.1 standard.

Additionally, to achieve the above the present invention is to also provide an extension apparatus for a universal serial bus (USB) interface, including: a transmitting device, including: a first packet-processing unit, for receiving a first interface packet and generating a first original data based on the first interface packet; a first buffering unit, being electrically coupled with the first packet-processing unit and temporarily storing the first original data; and a first data-converting unit, being electrically coupled with the first buffering unit and generating a first network packet signal based on the original data; and a receiving device, including: a second data-converting unit, for receiving the second network packet signal and generating the second original data which is recovered from the second network packet signal; a second buffering unit, being electrically coupled with the second data-converting unit and temporarily storing the second original data; and a second packet-processing unit, being electrically coupled with the second buffering unit to receive the second original data, and generating a second interface packet based on the second original data; and an electrical signal network cable, being electrically coupled between the transmitting device and the receiving device so as to transmit the first and second network packet signals.

In one embodiment of the present invention, wherein the transmitting device is disposed in a first electronic device, and the receiving device is disposed in a second electronic device. In other embodiment, the transmitting device and the receiving device are disposed in one electronic device.

Provided the above embodiments and features therein, the extension apparatus for a USB interface of the present invention directs to extend its transmission range or transmission distance by employing additional electrical signal network cable. However, these two different transmission mediums (i.e., original USB-based transmission line and the additional electrical signal network cable) have different standards and specifications and hence different transmission rates (i.e., the USB interface has a greater transmission rate then the electrical signal network cable). To be successfully and fluently transmitted over these two transmission mediums, packet data/signal may be properly processed by the transmitting device and receiving device of the extension apparatus to obtain appropriate formats compliant with both two transmission standards.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
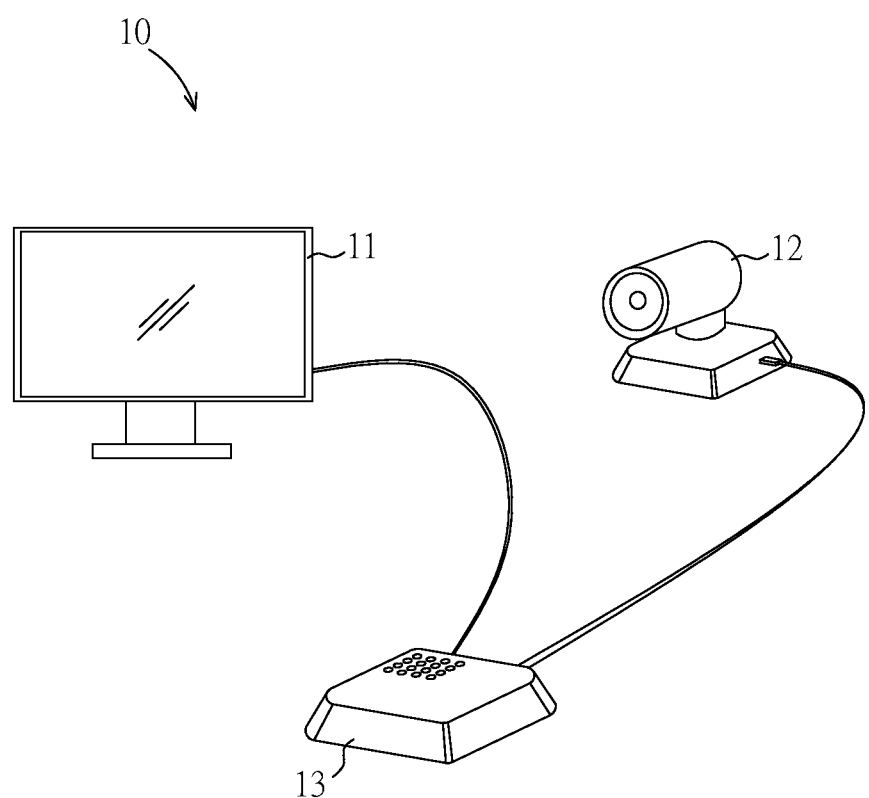
FIG. 1 is a schematic diagram illustrating an environment or circumstance to which extension apparatus for a USB interface according to the present invention is employed.
Figure 2:
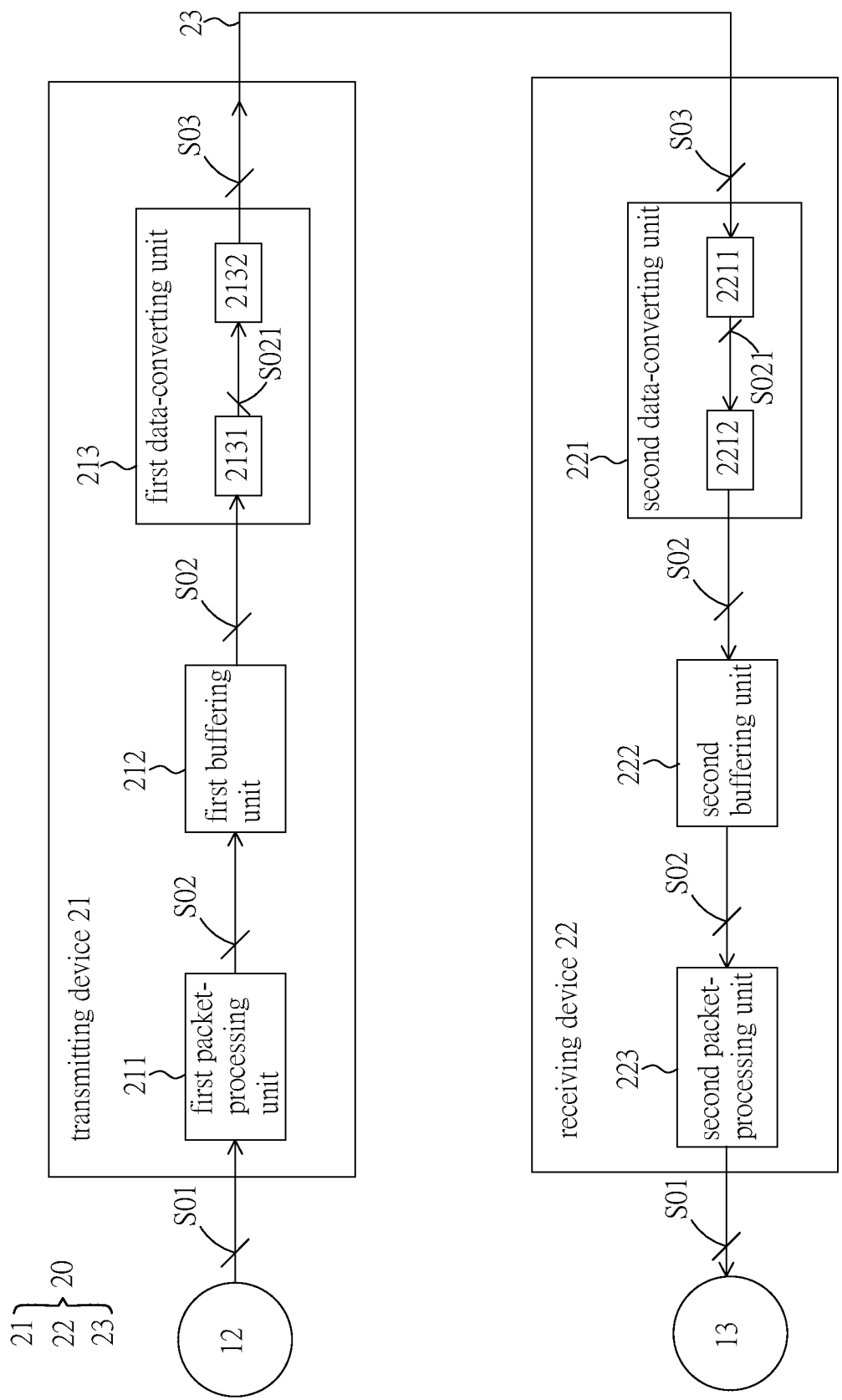
FIG. 2 is a block diagram of an extension apparatus for a USB interface according to the first embodiment of the present invention.

FIG. 1 is a schematic diagram illustrating an environment or circumstance to which extension apparatus 20 (or 30, 40) for a USB interface according to the present invention is employed, and FIG. 2 is a block diagram of an extension apparatus 20 for a USB interface according to the first embodiment of the present invention. Referring to both FIGS. 1 and 2, the extension apparatus 20 (or 30, 40) may be employed to facilitate, for example, a video conference which may be held with the assistance of a video conference system 10. The video conference system 10 may include a display device 11, a camera device 12 and a conference processing host or conference master console 13 (hereinafter referred to as "conference host 13"). In the case that the video conference is held in a wide-range indoor environment, e.g., a board conference room, the concerned devices (i.e., the display device 11, the camera device 12 and the conference host 13) of the video conference system 10 may be diversely located around the conference room, so that each device may be properly located to serve corresponding participant at respective location.

In one example, all of the display device 11, the camera device 12 and the conference host 13 may refer to USB-based devices, each of which may be equipped with one or more USB interfaces (for example, the high-speed USB 3.0 interfaces, also termed as "USB 3.1 Gen1" interfaces). The display device 11, the camera device 12 and the conference host 13 may be electrically or communicatively coupled with one another through these USB interfaces, and data/signal may be transmitted over these USB interfaces and corresponding USB-based transmission paths or transmission medium (e.g., USB connectors or USB transmission lines). In the first embodiment of the present invention, the "USB 3.1 Gen1" standard is taken to exemplarily describe and discuss all USB-related components (i.e., USB interfaces, USB connectors and USB transmission lines). In addition, in the first embodiment, "transmission path between the camera device 12 and the conference host 13" is taken to exemplarily describe and discuss data/signal transmission mechanism used by the present invention.

Now referring to FIG. 2, in the first embodiment of the present invention, the extension apparatus 20 may include a transmitting device 21, a receiving device 22 and an electrical signal network cable 23. Specifically, the transmitting device 21 may be electrically or communicatively connected with a USB connector (or termed as "USB terminal") of the camera device 12 of the video conference system 10, whereas the receiving device 22 may be electrically or communicatively connected with a USB connector of the conference host 13 of the video conference system 10. Furthermore, the electrical signal network cable 23 may be electrically or communicatively connected between the transmitting device 21 and the receiving device 22. In one example, the electrical signal network cable 23 may have a length ranging approximately from 5 meters to 100 meters. Moreover, the electrical signal network cable 23 may include an "unshielded twisted pair (UTP)" or a "Category-6 cable (CAT-6)".

At the transmitting side, the transmitting device 21 may include a first packet-processing unit 211, a first buffering unit 212 and a first data-converting unit 213. The first packet-processing unit 211 may be configured to receive a first interface packet S01 from the camera device 12, and then to generate an original data S02 (also termed as "raw data" or "source data") based on the received first interface packet S01. Specifically, the original data S02 may refer to an original image based on those captured by the camera device 12. Wherein, the camera device 12 may be configured to encode the original image as the first interface packet S01 to reach signal/electricity characteristics and data formats required by the USB 3.1 Gen1 standard. Correspondingly, the first packet-processing unit 211 may perform a decoding process on the first interface packet S01, so as to convert the first interface packet S01 back to the original data S02.

More particularly, the first interface packet S01 may include "USB video device class (UVC)" and/or "USB audio device class (UAC)", which may be compliant with the basic protocol and format defined by USB-IF. That is, the first interface packet S01 outputted by the camera device 12 may include real-time image information and/or real-time audio information.

The first buffering unit 212 may be electrically coupled with the first packet-processing unit 211. In the first embodiment, the first buffering unit 212 may refer to a "buffer" which is used for temporarily storing the original data S02.

Furthermore, the first data-converting unit 213 may be electrically coupled with the first buffering unit 212, so as to receive the original data S02 from the first buffering unit 212. Subsequently, the first data-converting unit 213 may generate a network packet signal S03 based on the received original data S02, and the generated network packet signal S03 may then be sent to the electrical-signal network cable 23. In other words, the first data-converting unit 213 may serve to convert the original data S02 into the network packet signal S03, so that the converted network packet signal S03 may comply with protocol or standard (i.e., UTP or CAT-6) at which the subsequent transmission path (i.e., the electrical signa network cable 23) operates.

In particular, the first data-converting unit 213 may further include a first data-compressing module 2131 and a first network packet-processing module 2132. The first data-compressing module 2131 may convert the original data S02 into an intermediate compressed data S021 based on a first compression standard. Thereafter, with the help of an error-correction encoding procedure, the first network packet-processing module 2132 may generate the network packet signal S03 based on the intermediate compressed data S021. In one example, the first compression standard may include "MPEG-4 Part 10, Advanced Video Coding" ("MPEG-4 AVC", which is also termed as "H.264") or "High Efficiency Video Coding" ("HEVC", which is also termed as "H.265"). In addition, the error-correction encoding procedure performed by the first network packet-processing module 2132 may include, for example, "forward error-correction (FEC)" algorithm or "channel coding" algorithm, which may additionally introduce redundant bits or codewords into data-payload so as to reduce detection-error in data transmission.

At the receiving side, the receiving device 22 may include a second data-converting unit 221, a second buffering unit 222 and a second packet-processing unit 223. The second data-converting unit 221 may receive the network packet signal S03 through the electrical-signal network cable 23. Furthermore, the second data-converting unit 221 may perform a recovery process on the network packet signal S03 so as to obtain the recovered original data S02. In other words, the second data-converting unit 221 may be similar to the first data-converting unit 213 except that, the second data-converting unit 221 may perform a reverse-operation with respect to the first data-converting unit 213.

In addition, the second data-converting unit 221 may further include a second network packet-processing module 2211 and a second data-compressing module 2212. The two modules 2211 and 2212 of the second data-converting unit 221 may serve to perform reverse-operation corresponding to the first network packet-processing module 2132 and the first data-compressing module 2131 of the first data-converting unit 213. That is, the second network packet-processing module 2211 may receive the network packet signal S03 and then obtain an intermediate compressed data S021 with the help of an error-correction encoding procedure. Thereafter, based on the first compression standard, the second data-compressing module 2212 may perform a decompression operation on the intermediate compressed data S021 to obtain the recovered original data S02. For the second data-converting unit 221, the performed error-correction encoding procedure and the adopted first compression standard may be the same as those taken by the first data-converting unit 213.

Furthermore, the second buffering unit 222 may be electrically coupled with the second data-converting unit 221 so as to receive and then store the original data S02. In the first embodiment, the second buffering unit 222 may be the same as the first buffering unit 212, which may also refer to a "buffer" used for temporarily storing the original data S02.

Moreover, the second packet-processing unit 223 may be electrically coupled with the second buffering unit 222, so as to receive the original data S02 from the second buffering unit 222 and then generate a first interface packet S01 based on the original data S02. Subsequently, the first interface packet S01 may be sent to the conference host 13. In first embodiment, the second packet-processing unit 223 may perform an encoding operation on the original data S02 so as to obtain the first interface packet S01 complaint with the USB 3.1 Gen 1 standard.

Figure 3:
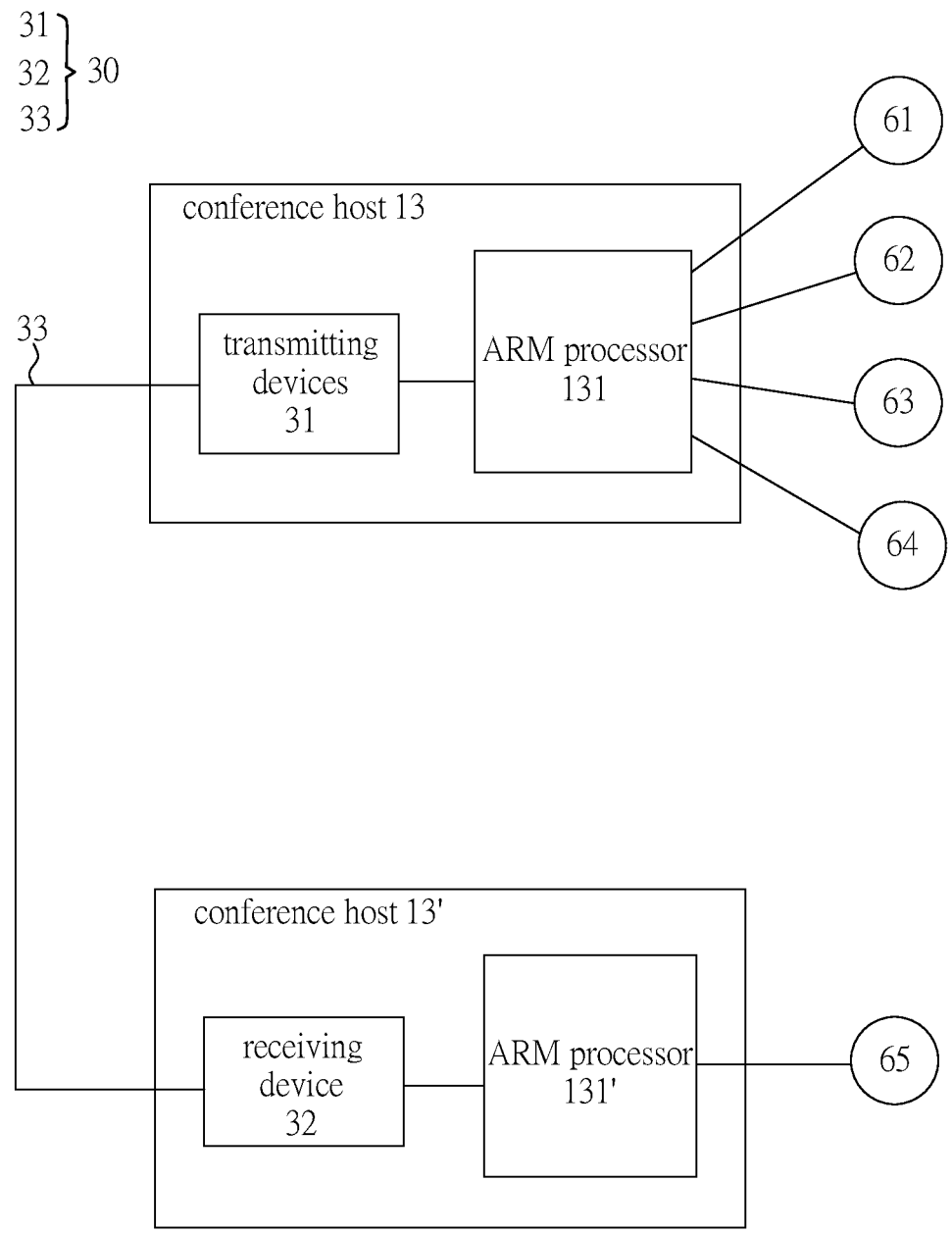
FIG. 3 is a block diagram of an extension apparatus for an USB interface according to the second embodiment of the present invention.

FIG. 3 is a block diagram of an extension apparatus 30 for an USB interface according to the second embodiment of the present invention. The extension apparatus 30 may include a transmitting device 31, a receiving device 32 and an electrical-signal network cable 33. The transmitting device 31 and receiving device 32 may be the same as the transmitting device 21 and receiving device 22 of the first embodiment in both function and structure except that, the transmitting device 31 and receiving device 32 of the second embodiment may be internally built within an electronic device.

In one example, the transmitting device 31 may be internally built within the conference host 13 so as to electrically couple with a processor 131 (e.g., an "Advanced RISC Machine (ARM)" processor) of the conference host 13. Furthermore, other peripheral devices equipped with USB 3.0 interfaces, such as speaker 61, microphone 62, video camera 63 and keyboard/mouse 64 may be electrically coupled with the ARM processor 131 of the conference host 13 directly. Moreover, signal from such peripheral devices may be transmitted through the ARM processor 131 and then be outputted by the transmitting device 31.

On the other hand, the receiving device 32 may be internally built within another conference host 13' and electrically coupled with an ARM processor 131'. Furthermore, other device(s) such as a computer 65 may be electrically coupled with the ARM processor 131' of the conference host 13' through "high definition multimedia interface (HDMI)", USB interface or RJ45 interface. In addition, the electrical signal network cable 33 may be electrically coupled between the transmitting device 31 and the receiving device 32.

Figure 4:
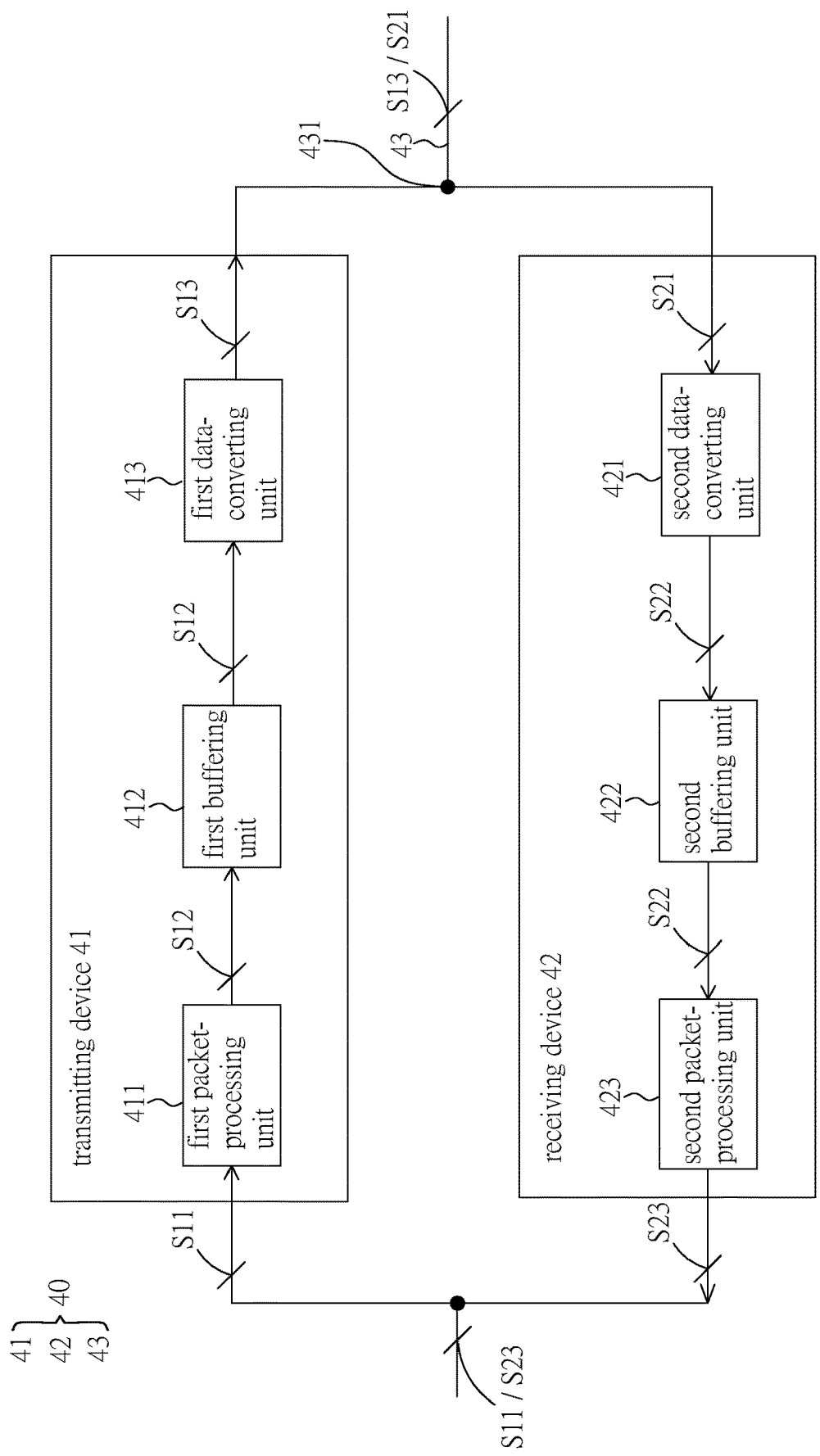
FIG. 4 is a block diagram of an extension apparatus for an USB interface according to the third embodiment of the present invention.

FIG. 4 is a block diagram of an extension apparatus 40 for an USB interface according to the third embodiment of the present invention. Referring to FIG. 4, the extension apparatus 40 for an USB interface may include a transmitting device 41, a receiving device 42 and an electrical signal network cable 43. The extension apparatus 40 of the third embodiment may be similar to the extension apparatuses 20 and 30 of the first and second embodiments except that, the transmitting device 41 together with the receiving device 42 of the extension apparatus 40 may refer to a complete set or a grouped set, and also, may as a whole be built within a single electronic device. Furthermore, one end 431 of the electrical signal network cable 43 may be electrically coupled with the transmitting device 41 and the receiving device 42, while the other end (not shown) of the electrical signal network cable 43 may be electrically coupled with a transmitting device and a receiving device of other extension apparatus (not shown). In one example, a conference host (for example, the conference host 13 illustrated in FIG. 3) may be equipped with a transmitting device and a receiving device (for example, the transmitting device 41 and receiving device 42 illustrated in FIG. 4), and may be located within one conference room. On the other hand, another conference host (not shown), also equipped with a transmitting device and a receiving device (not shown), may be located within a different conference room. In the above case, these two conference hosts may be electrically (or communicatively) coupled with each other through an electrical-signal network cable cross these two conference rooms.

At the transmitting side, the transmitting device 41 may be the same as the transmitting device 21 of the first embodiment in both function and structure. In brief, the transmitting device 41 may include a first packet-processing unit 411, a first buffering unit 412 and a first data-converting unit 413. The first packet-processing unit 411 may be configured to receive a first interface packet S11 through the USB interface, and then to generate a first original data S12 based on the received first interface packet S11. Furthermore, the first buffering unit 412 may be electrically coupled with the first packet-processing unit 411, so as to receive and then temporarily store the first original data S12. Moreover, the first data-converting unit 413 may be electrically coupled with the first buffering unit 412, so as to receive the first original data S12 from the first buffering unit 412. Subsequently, the first data-converting unit 413 may generate a first network packet signal S13 based on the received first original data S12, and the generated first network packet signal S13 may then be sent to the electrical-signal network cable 43.

On the other hand, at the receiving side, the receiving device 42 may include a second data-converting unit 421, a second buffering unit 422 and a second packet-processing unit 423. Specifically, the second data-converting unit 421 may receive a second network packet signal S21 through the electrical-signal network cable 43. Furthermore, the second data-converting unit 421 may convert the second network packet signal S21 into a second original data S22. Moreover, the second buffering unit 422 may be electrically coupled with the second data-converting unit 421 so as to receive and then temporarily store the second original data S22. In addition, the second packet-processing unit 423 may be electrically coupled with the second buffering unit 422 so as to receive the second original data S22, and then generate a second interface packet S23 based on the second original data S22. Subsequently, the second interface packet S23 may be sent to the USB interface.

In one example (as mentioned in former paragraphs) of the third embodiment, each of the two individual conference hosts may be equipped with a transmitting device and a receiving device, and the two conference hosts may be coupled with each other through an electrical signal network cable. Whereas, in another example of the third embodiment, electronic devices (such as the camera 63 or the computer 65 illustrated in FIG. 3) located adjacent to and coupled with respective one of the two individual conference hosts, may be also equipped with a transmitting device and/or a receiving device having respective extension apparatuses 40. Given the above arrangement, with the aid of the extension apparatuses 40, transmission path between the concerned electronic devices (i.e., the camera 63 or the computer 65 illustrated in FIG. 3, each has the USB 3.0 interface) may reach a greater transmission distance.

In summary, the extension apparatuses 20, 30 or 40 for a USB interface according to the present invention employ transmitting devices 21, 31 or 41 to properly convert packet signal (i.e., the first interface packets S01 and S11, which are compliant with USB 3.1 Gen1 standard) into network packet signal (i.e., the network packet signal S03 and the first network packet signal S13, which are compliant with UTP or CAT-6 standard). Furthermore, the converted network packet signal may be sent to receiving devices 22, 32 or 42 at a peer site (another conference host or another peripheral device) through an additional electrical signal network cable (i.e., UTP or CAT-6 network cable). Moreover, the peer receiving devices 22, 32 or 42 may convert the network packet signal back to the packet signal compliant with USB 3.1 Gen1 standard. By means of the above arrangements and operations, transmission path between two peer sites may be greatly lengthened with the additional electrical signal network cable (for example, may be lengthened to a distance of approximately 100 meters). In addition, the extension apparatus 20, 30 or 40 of the present invention may also provide sufficient bandwidth for real-time image/audio signal, so that real-time transmission for those bandwidth-consumed image/audio signal may be effectively achieved.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. An extension apparatus for a universal serial bus (USB) interface, comprising:

a transmitting device, comprising:

a first packet-processing unit, for receiving a first interface packet, which is compliant with USB standard and generating an original data based on the first interface packet;

a first buffering unit, being electrically coupled with the first packet-processing unit and temporarily storing the original data; and a first data-converting unit, being electrically coupled with the first buffering unit and generating a network packet signal based on the original data, wherein the data format of the network packet signal is different from the data format of the first interface packet, comprising:

a first data-compressing module, for converting the original data into an intermediate compressed data based on a first compression standard, which is compliant with Advanced Video Coding or High Efficiency Video Coding; and a first network packet-processing module, for performing an error-correction encoding procedure to obtain the network packet signal based on the intermediate compressed data; and a receiving device, comprising:

a second data-converting unit, for receiving the network packet signal and generating the original data which is recovered from the network packet signal;

a second buffering unit, being electrically coupled with the second data-converting unit and temporarily storing the original data; and a second packet-processing unit, being electrically coupled with the second buffering unit to receive the original data, and generating the first interface packet based on the original data; and an electrical signal network cable, being electrically coupled between the transmitting device and the receiving device so as to transmit the network packet signal.

2. The extension apparatus of claim 1, wherein the second data-converting unit comprises:

a second network packet-processing module, for receiving the network packet signal and performing the error-correction encoding procedure to obtain the intermediate compressed data based on the network packet signal; and a second data-compressing module, for converting the intermediate compressed data into the original data based on the first compression standard, which is compliant with Advanced Video Coding or High Efficiency Video Coding.

3. The extension apparatus of claim 1, wherein the transmitting device is disposed in a first electronic device, and the receiving device is disposed in a second electronic device.

4. The extension apparatus of claim 1, wherein the electrical signal network cable includes an unshielded twisted pair (UTP) or a category-6 cable (CAT-6).

5. The extension apparatus of claim 1, wherein the first interface packet includes a real-time image information and/or a real-time audio information.

6. The extension apparatus of claim 1, wherein the electrical signal network cable has a length ranging from approximately 5 to 100 meters.

7. The extension apparatus of claim 1, wherein the first interface packet is compliant with USB 3.1 standard.

8. An extension apparatus for a universal serial bus (USB) interface, comprising:

a transmitting device, comprising:

a first packet-processing unit, for receiving a first interface packet, which is compliant with USB standard and generating a first original data based on the first interface packet;

a first buffering unit, being electrically coupled with the first packet-processing unit and temporarily storing the first original data; and a first data-converting unit, being electrically coupled with the first buffering unit and generating a first network packet signal based on the original data, wherein the data format of the first network packet signal is different from the data format of the first interface packet, comprising:

a first data-compressing module, for converting the original data into an intermediate compressed data based on a first compression standard, which is compliant with Advanced Video Coding or High Efficiency Video Coding; and a first network packet-processing module, for performing an error-correction encoding procedure to obtain the first network packet signal based on the intermediate compressed data; and a receiving device, comprising:

a second data-converting unit, for receiving a second network packet signal and generating a second original data which is recovered from the second network packet signal;

a second buffering unit, being electrically coupled with the second data-converting unit and temporarily storing the second original data; and a second packet-processing unit, being electrically coupled with the second buffering unit to receive the second original data, and generating a second interface packet, which is compliant with USB standard based on the second original data, wherein the data format of the second network packet signal is different from the data format of the second interface packet; and an electrical signal network cable, being electrically coupled between the transmitting device and the receiving device so as to transmit the first network packet signal and the second network packet signal.

9. The extension apparatus of claim 8, wherein the transmitting device and the receiving device are both disposed in a single electronic device.

\* \* \* \* \*